C. A. McELROY.
Carriage-Spring.
No. 16,802.
Patented Mar. 10, 1857
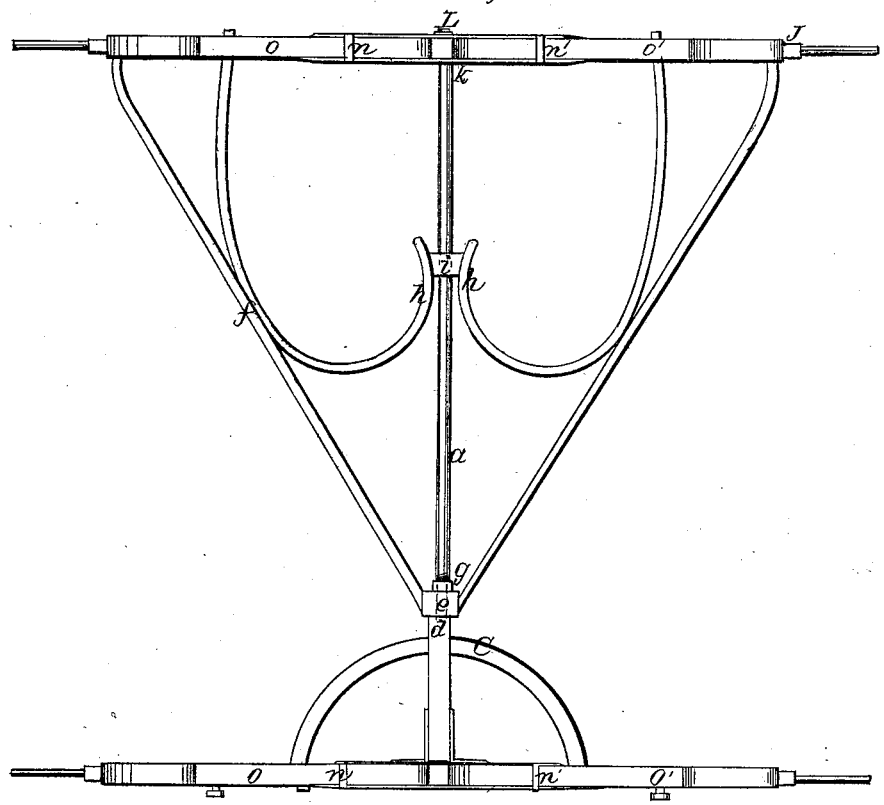
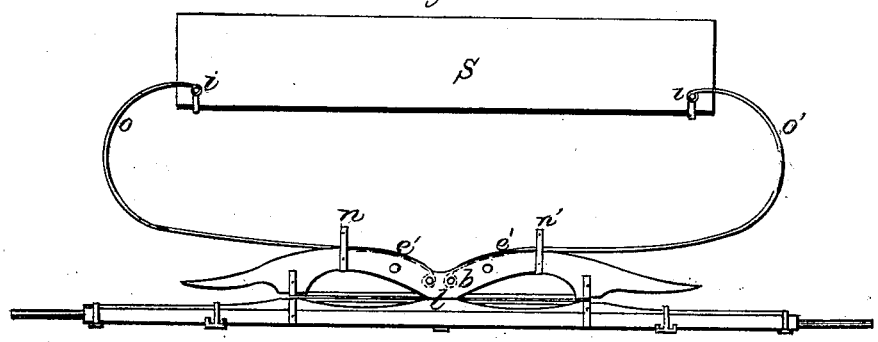

UNITED STATES PATENT OFFICE.

CHARLES A. McELROY, OF DELAWARE, OHIO.

ARRANGEMENT OF CARRIAGE-SPRINGS.

Specification of Letters Patent No. 16,802, dated March 10, 1857.

*To all whom it may concern:*

Be it known that I, CHARLES A. MCELROY, of Delaware, in the county of Delaware and State of Ohio, have invented a new and Improved Coupling and Springs for Carriages and Buggies; and the following is a full, clear, and exact description of the principle or character which distinguishes it from all others before known and the usual manner of making, modifying, and using the same, reference being had to the annexed drawings, of which—

Figure 1 is a perspective view. Fig. 2 is plan view with the body attached.

The nature of my invention consists in the arrangement of the springs, pivoted on the circular head block, together with the stirrups which serve to keep the springs in their proper position, there being sufficient space left between the springs and the stirrups to allow the springs to adjust themselves to any uneven surfaces over which the vehicle may pass.

The object by which I have acquired this complete device has been solely from study and experience on this subject and this I have attained as will be clearly seen by close observance of the following description.

The reach, $a$, is secured to the head block, $b$, by any of the known means. The reach, $a$, is made round in rear of the fifth wheel, $c$, forming a shoulder, $d$, for the front end of the swivel, $e$, which is attached to the forward ends of the long brasses, $f, f$. The reach, $a$, passes through the swivel, $e$, and box, $i$, which is attached to the short brasses, $h, h$, and through the center of the axletree, $j$, to the shoulders, $k$ and $d$, and is secured by the screw and nut or collar, $g$, and screw and nut L. In combination with these parts is the arrangement of the springs, $o\ o\ o\ o$, and headblock, $b$, and axle bed, $l$, and stirrups, $n\ n\ n\ n$. The headblock, $b$, is of a peculiar shape circling each way from the center with a deep slot on the upper side to receive the lower ends of the springs $o\ o\ o\ o$ as shown in Fig. 1 the lower ends of the springs $o\ o\ o\ o$ are made to fit onto their respective circles, $e\ e$, and are secured to the headblock, $b$, by bolts. The stirrups $n\ n\ n\ n$ which are secured to the headblock and axle bed serve to keep the springs in their proper position, and the space between the stirrups $n\ n$ and the upper side of the springs $o\ o\ o\ o$ allows the springs to adjust themselves to the uneven surfaces over which the vehicle passes.

The object of this invention is to prevent the straining and wrenching of both gearing and body at those points most liable to be, in passing over uneven surfaces and this I have done in providing a swivel coupling in combination with the adjustable springs as shown in the specification and drawings.

What I claim and desire to secure by Letters Patent is—

The springs ($o$) pivoted as described, and stirrups ($n$) all arranged and operated in the manner and for the purposes above set forth.

CHARLES A. McELROY.

Witnesses:
 JNO. A. BURNHAM,
 R. V. BURR.